United States Patent [19]

Ikebe et al.

[11] Patent Number: 5,153,801
[45] Date of Patent: Oct. 6, 1992

[54] DISK CARTRIDGE HAVING COUPLED SHUTTERS FOR CLOSING PLURAL CARTRIDGE OPENINGS

[75] Inventors: Masaru Ikebe, Komoro; Morimasa Sasaki, Saku; Haruo Shiba, Komoro; Kenji Hashizume, Miyotamachi, all of Japan

[73] Assignee: TDK Corporation, Tokyo, Japan

[21] Appl. No.: 705,022

[22] Filed: May 22, 1991

[30] Foreign Application Priority Data

| May 23, 1990 | [JP] | Japan | 2-52967[U] |
| Dec. 21, 1990 | [JP] | Japan | 2-404056[U] |
| Dec. 21, 1990 | [JP] | Japan | 2-404058[U] |
| Dec. 21, 1990 | [JP] | Japan | 2-404059[U] |
| Mar. 7, 1991 | [JP] | Japan | 3-19628[U] |
| Mar. 12, 1991 | [JP] | Japan | 3-21224[U] |

[51] Int. Cl.$^5$ .............................. G11B 23/03
[52] U.S. Cl. ....................... 360/133; 369/291
[58] Field of Search ................ 360/133; 369/291

[56] References Cited

U.S. PATENT DOCUMENTS

4,694,448  9/1987  Tamaru ..................... 360/133 X
4,695,911  9/1987  Loosen ...................... 360/133

Primary Examiner—A. J. Heinz
Attorney, Agent, or Firm—Price, Gess & Ubell

[57] ABSTRACT

A disk cartridge has a case rotatably containing a disk therein and formed with a driving shaft insertion hole and a plurality of pickup insertion holes. A rotary shutter formed with a plurality of window holes at positions corresponding to the plurality of pickup insertion holes and rotatably provided at the driving shaft insertion hole as a center is provided. A turning shutter having a center at a position separate from the center of the rotary shutter to be rotatable with respect to the center for opening and closing the driving shaft insertion hole is provided. The turning shutter and the rotary shutter are operated cooperatively by charging or removing the disk cartridge in or from a recording/reproducing disk player to open or close the driving shaft insertion hole and the plurality of pickup insertion holes of the case.

26 Claims, 5 Drawing Sheets

DISK CARTRIDGE HAVING COUPLED SHUTTERS FOR CLOSING PLURAL CARTRIDGE OPENINGS

BACKGROUND OF THE INVENTION

1. Field of the Invention

This invention relates to a disk cartridge which rotatably contains a flexible disk or a hard disk, or particularly an optical disk in a case.

2. Description of the Prior Art

A flexible disk, an optical disk or an optomagnetic disk as an information recording carrier is generally used so as to be set in a recorder/reproducer such as a disk player or the like as a disk cartridge contained in a case.

A conventional disk of this type has been known to be contained in a case with a slide shutter for opening or closing a pickup insertion hole formed in the case and a driving shaft insertion hole at the time of using the disk or not using the disk due to the facts that dust tends to be adhered in operation, the disk is easily damaged and has a large influence of temperature change.

However, when a large quantity of data are momentarily recorded or reproduced in an optical disk or the like, a plurality of pickup insertion holes are required. If the plurality of pickup insertion holes are formed in the cartridge, shutters for simultaneously opening or closing all the pickup insertion holes and driving shaft insertion hole so as to protect the disk against the dust and the like at the time of using or not using the disk are required but there arises a problem that, if a unidirectional slide shutter is employed to open and close these holes, the entire disk cartridge must be increased in size.

A rotary shutter has been considered, but if the rotary shutter is opened and closed by a slider, the coupling section of the shutter to the slider must be disposed outside a disk rotating region. The sliding distance of the slider is increased, and there are further problems in that a shutter opening and closing mechanism is increased in size, the operating distance of a spring for closing the shutter is increased, and the shutter operating force becomes largely different at the times of opening and closing the shutter. If a slider of linear motion is engaged with a rotary shutter of rotating motion, there is a position where the shutter opening and closing forces become very large. Thus, in some cases, the shutter is not opened or closed, and the shutter is deformed by the unreasonable force. Further, there has been proposed a method of reducing the sliding distance of the slider a method of employing a reduction gear and a method of disposing a position of interlocking the slider to the shutter at the end with respect to the slider sliding direction. However, in the former case, a space for occupying the mechanism is increased or a larger shutter opening or closing force is required. In the latter case, the slider force acting direction is different from the shutter force operating direction so that the slider and the shutter is scarcely operated or the shutter is hardly operated. Thus, the constitution is complicated.

In the conventional disk cartridge, a shutter of sectional U-shape is disposed outside the disk cartridge. Therefore, the disk is opposed to the inner surface of the case formed of synthetic resin. Since the inner surface of the case opposed to the disk is formed of synthetic resin, a static electricity is easily generated and noise is easily generated at a driving head due to dust adhered thereto.

SUMMARY OF THE INVENTION

Accordingly, an object of this invention is to provide a disk cartridge which can eliminate the above-described drawbacks of the conventional disk cartridge and which can safely contain a disk even in the case of having a plurality of pickup insertion holes in a case for containing a disk.

Another object of this invention is to provide a disk cartridge which can positively open and close insertion holes and can prevent invasion of dust.

Still another object of this invention is to provide a disk cartridge which can smoothly and safely operate a shutter for opening and closing insertion holes.

According to this invention, a novel disk cartridge is provided. The disk cartridge of this invention comprises a case which can rotatably contain a disk and is formed with a driving shaft insertion hole and a plurality of pickup insertion holes. A plurality of window holes are formed at the positions corresponding to the plurality of pickup insertion holes formed at the case, and a rotary shutter rotatably provided at the driving shaft insertion hole as a center is provided. A turning shutter having a center at a position separate from the center of the rotary shutter for opening and closing the driving shaft insertion hole formed rotatably at the case with respect to the center is also provided.

In a preferred embodiment, the disk cartridge of this invention has a member having a metal surface on the rotary shutter.

In another preferred embodiment, a spring for energizing a rotary shutter and a turning shutter in a closing direction and for holding them at an opening position is provided on the inner wall of the case at a distance substantially equal in the opening and closing positions of the turning shutter.

In still another preferred embodiment, a slider for sliding on the outer peripheral end of the case is provided, and coupled to the rotary shutter.

These and other objects and features of the present invention will become apparent from the following detailed description in conjunction with the attached drawings.

DESCRIPTION OF THE PREFERRED EMBODIMENT

Preferred embodiments of a disk cartridge of the present invention will be described with reference to FIGS. 1A to 3. A case of the disk cartridge denoted by reference numeral 10 as a whole is composed of an upper case 12 and a lower case 14, the outer profiles of which are formed substantially in a rectangular plate shape. A disk 36 is rotatably contained in the case 10. The upper case 12 and the lower case 14 have the same shape, a shutter opening and closing mechanism and the same component members associated therein.

Figure 1A:
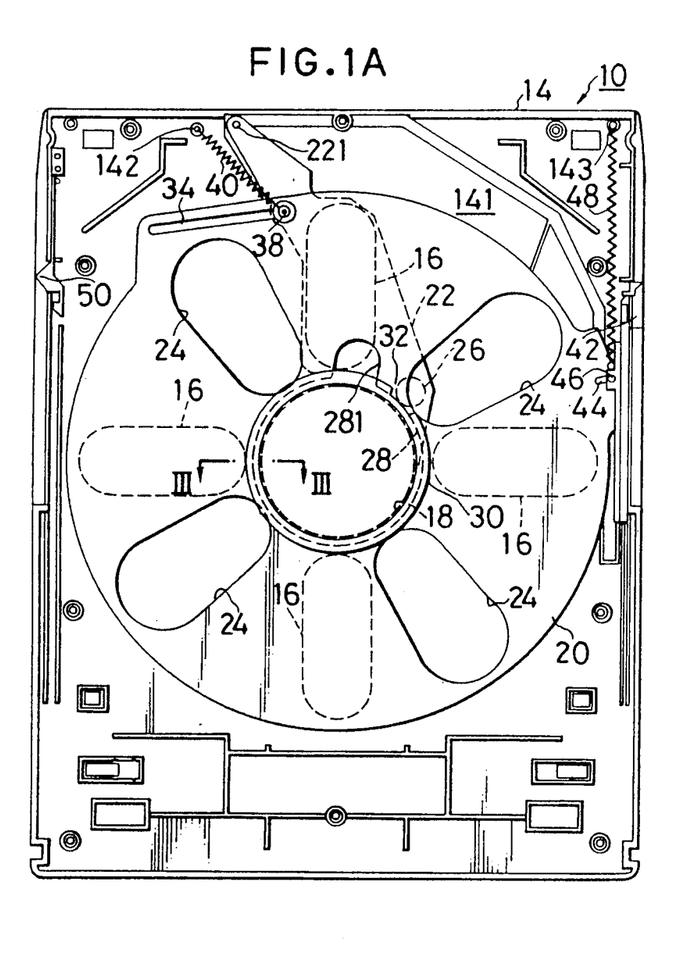
FIG. 1A is a plan view of a lower case showing an operating state of an embodiment of a disk cartridge in the case of closing a shutter according to the present invention.
Figure 2:
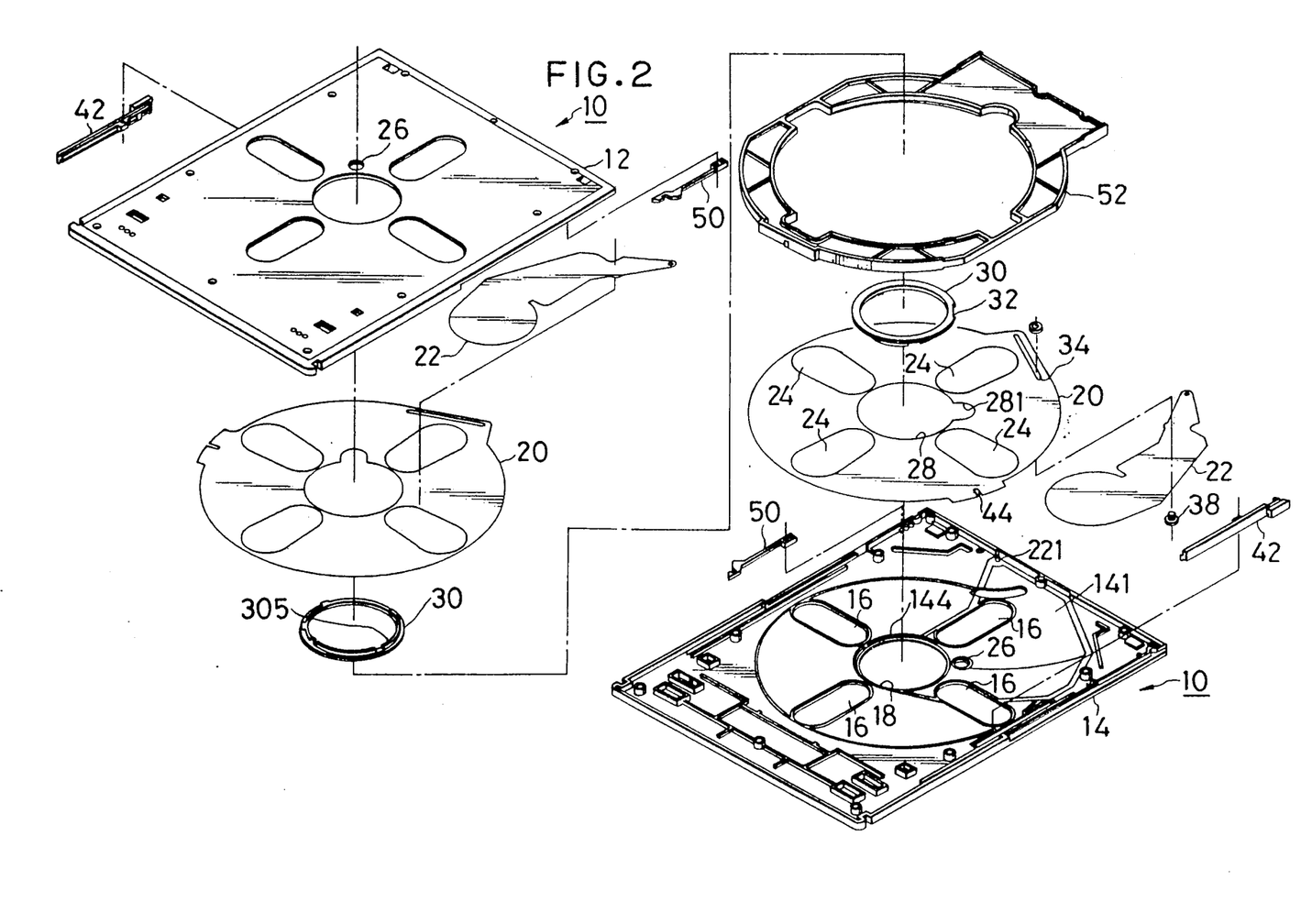
FIG. 2 is a perspective view of a disassembled disk cartridge.
Figure 3:
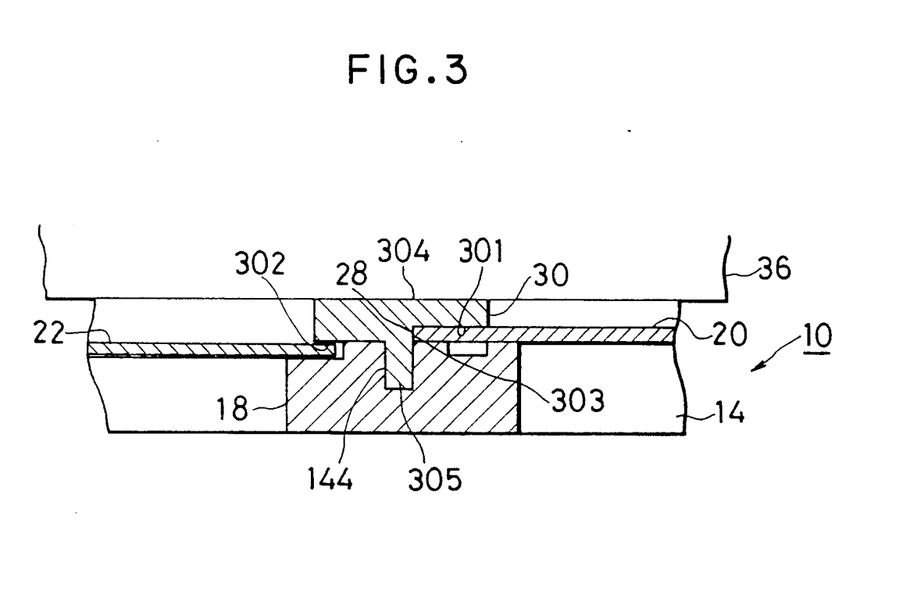
FIG. 3 is a partial sectional view taken along the line III—III in FIG. 1A.

Therefore, the lower case 14 and the component members of the lower case 14 will be described so as to avoid duplicate of the description. A circular driving shaft insertion hole 18 is formed at the central portion of the lower case 14, and a plurality of long pickup insertion holes 16 of semicircular shape at both ends are formed radially at an interval on the circumference of radial outward direction of the driving shaft insertion hole 18. An indexing detection hole 26 is formed at the intermediate of two adjacent pickup insertion holes 16 near the driving shaft insertion hole 18. A recess 141 is formed inside the lower case 14 corresponding to the moving range of a turning shutter 22, and the turning shutter 22 is disposed in the recess 141. A rotary shutter 20 is superposed above the turning shutter 22. The rotary shutter 20 is formed substantially in a disk-shaped flat plate, formed with a plurality of window holes 24 at an interval at the positions corresponding to the pickup insertion holes 16 of the lower case 14 and a central hole 28 at the center, and rotatably supported by a disk holder 30 provided at the periphery of the driving shaft insertion hole 18 of the case 14. Each of the window holes 24 formed at the periphery of the driving shaft insertion hole 18 of the case 14 is formed in an elliptical shape in which the opening width of the window hole is gradually increased from the inner peripheral side toward the outer peripheral side. The central hole 28 of the rotary shutter 20 is partly formed with a cutout 281 corresponding to the indexing detection hole 26 of the case 14. The rotary shutter 20 is formed substantially in the same shape as the disk 36. Since static electricity is generated when the surface of the rotary shutter 20, opposed to the disk 36, is formed of metal, it is preferable to form the entirety of a metal material such as stainless steel or aluminum alloy. A synthetic resin plate in which its surface is finished with a metal-plated layer such as a chromium-plated layer may be employed as the rotary shutter.

The shape of the window hole 24 formed at the rotary shutter 20 will be described in more detail. Since the moving distance of the outer peripheral side of the rotary shutter 20 with respect to a predetermined rotating angle is longer than that of the inner peripheral side, when the window hole formed at the shutter is formed in the same shape as the pickup insertion hole formed at the case, there is a trend that the window hole is not completely opened at the outer peripheral side even due to a small deviation of the rotating angle. Therefore, even if a small deviation occurs at the rotating angle the window hole 24 formed at the rotary shutter 20 can be accurately and completely opened by forming the window hole 24 in such a manner as to gradually increase the opening width from the inner peripheral side toward the outer peripheral side as in this embodiment.

The turning shutter 22 is pivotally supported by a pivotal connector 221 having a center at a position separate from the center of the rotary shutter 20, and disposed rotatably in the recess 141 of the case 14 so as to open or close the driving shaft insertion hole 18, the indexing detection hole 26 and the cutout 281 of the rotary shutter 20. The turning shutter 22 is formed in such a shape so as not to close all the openings of the driving shaft insertion hole 18, the pickup insertion hole 16 and the indexing detection hole 26 formed at the lower case 14 when these openings are opened as the turning shutter 22 and the rotary shutter 20 are moved to the opening positions and to close the driving shaft insertion hole 18, the indexing detection hole 26 and the cutout 32 of the disk holder 30 when these openings are closed. The rotary shutter 20 and the turning shutter 22 are provided to be able to be interlocked to each other by engaging a cam mechanism such as a cam groove 34 with an engaging shaft 38. In this embodiment, a cam groove 34 is formed to be extended substantially tangentially to the outer periphery of the rotary shutter 20. An engaging shaft 38 to be engaged with the cam groove 34 is provided at the intermediate portion near the pivotal connector 221 of the turning center of the turning shutter 22. A spring 40 for energizing so as to bias both the shutters 20 and 22 towards a closing direction at an opening position is extended between the engaging shaft 38 of the cam mechanism and the inner wall 142 of the case near the pivotal connector 221 of the rotary shutter 22. The inner wall portion 142 of the case to which one end of the spring 40 is fixed is provided at a position substantially equal from both the positions of the engaging shaft 38 when the turning shutter 22 is disposed at the opening and closing positions. It is preferable to extend the spring 40 so that the longitudinal direction of the cam groove 34 formed on the rotary shutter 20 becomes substantially the same as the energizing direction of the spring 40 when the rotary shutter 20 and the turning shutter 22 are opened.

When the disk cartridge is charged in or removed from a recorder/reproducer, a slider 42 connected to the rotary shutter 20 is slidably provided along the outer end of the lower case 14 so as to open or close the rotary shutter 20 and the turning shutter 22. In this embodiment, the rotary shutter 20 is coupled to the slider 42 by a radial cutout 44 formed on the outer periphery of the rotary shutter 20 and an engaging pin 46 fixed to the slider 42 to be engaged with the cutout 44. A spring 48 for energizing the rotary shutter 20 and the turning shutter 22 in a closing direction is extended between the slider 42 and the corner 143 of the lower case 14.

The disk holder 30 is mounted around the driving shaft insertion hole 18 of the case 14 so as to be a bearing for supporting the rotary shutter 20, to position the disk 36 so that the disk 36 may not contact with the rotary shutter 20 and to restrict the height direction of the rotary shutter 20 and the turning shutter 22. The disk holder 30 is a ring to be disposed around the driving shaft insertion hole 18, and has downward end surfaces 301 and 302, shown in FIG. 3, for restricting the upper surfaces of the rotary shutter 20 and the turning shutter 22, a cylindrical wall 303 engaged with the hole 28 of the rotary shutter 20 to become a bearing and an upper end surface 304 extended radially outwardly from the top of the cylindrical wall 303 for supporting the disk 36. An arcuate-shaped rib 305 formed downwardly and outwardly from the cylindrical wall 303 is engaged within the groove 144 formed inside the case 14 and adhesively fixed thereto. The upper end surface 304 of the disk holder 30 is partly formed with the cutout 32 at the portion of the angle where the indexing detection hole 26 is formed on the case 14.

A stopper 50 is provided along the end of the lower case 14 at the opposite side to the end provided with the slider 42, and formed at its end with a hook to be engaged with the end of the slider 42 on the side of the upper case 12 when the rotary shutter 20 and the turning shutter 22 provided at the upper case 12 side are closed.

Figure 1B:
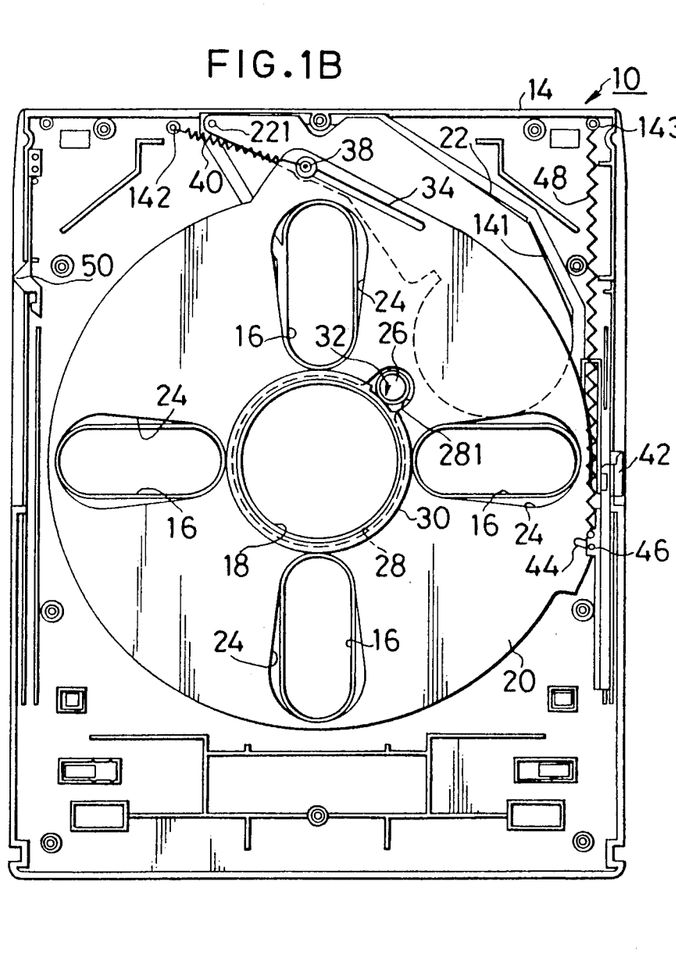
FIG. 1B is a plan view of a lower case showing another operating state of the same disk cartridge in the case of opening the shutter.

A half assembly of the lower case 14 side is constructed as described above, and a half assembly of the upper case 12 side also has the same shape and constitution as those of the lower case 14. The half assemblies of both the cases are adhered by superposing them through the disk 36 and a spacer 52 therein to complete a disk cartridge. When the disk cartridge of the embodiment constructed as described above is inserted and set in a recorder/reproducer, the end of the slider 42 is disengaged from the hook of the stopper 50, the slider 42 is moved against the spring 48, the rotary shutter 20 is rotated at the disk holder 30 provided around the driving shaft insertion hole 18 as a center via the engaging pin 46 and the engaging cutout 44 in cooperation with the slider 42, and the pickup insertion holes 16 formed at the case and the window hole 24 of the rotary shutter 20 are matched to be opened. Since the turning shutter 22 is turned at the pivotal connector 221 as a center by the cam groove 34 and the engaging shaft 38 upon rotation of the rotary shutter 20, the driving shaft insertion hole 18 and the indexing detection hole 26 are opened. The rotary shutter 20 and the turning shutter 22 in which the driving shaft insertion hole 18, the pickup insertion holes 16 and the indexing detection hole 26 are opened are held at opening positions by the slider 42 and the spring 40 as shown in FIG. 1B.

On the other hand, when the disk cartridge is removed from the recorder/reproducer, the slider 42 is slid by the contraction force of the spring 48, the rotary shutter 20 is rotatably moved by the engaging pin 46 and the engaging cutout 44, the turning shutter 22 is turned in cooperation with the rotary shutter 20 to close the driving shaft insertion hole 18, the pickup insertion holes 16 and the indexing detection hole 26, and both the shutter 20 and 22 are held in closed state as shown in FIG. 1A. The end of the slider 42 is engaged with the hook of the stopper 50.

The reason why the upper case 12 and the lower case 14 are constructed in the same manner will be described. When the indexing detection holes 26 provided at the upper and lower cases 12 and 14 of the disk cartridge are projected on a common surface perpendicular to the rotating axis of the disk 36, they are disposed at symmetrical positions with respect to one center line on the common surface. When the pivotal connectors of the turning shutters of the upper and lower cases are disposed at the same position on the projecting surface, the turning shutters are turned in the same direction and the cutouts formed on the rotary shutters are opened and closed so as to open and close the driving shaft insertion hole, the indexing detection hole and the cutouts formed on the rotary shutter to pass through the detection hole, the turning shutters become different in shapes at the upper and lower case sides. In other words, it is necessary to further project the indexing detection hole closing portion from the driving shaft insertion hole closing circular portion in the turning shutter of one side. Therefore, an arcuate-shaped rib to become an adhering portion to the case of the disk holder of about half a circle of the portion crossing the disk holder becomes substantially half a circle when the turning shutter is moved to open and close at one side, while the crossing portion of the disk holder of the turning shutter becomes considerably larger than a half a circle at the other side, the arcuate-shaped rib to become an adhered portion of the disk holder to the case is formed to be only about ¼ of a circle. Thus, the rigidity of the disk holder is largely reduced. Therefore, the disk holder is deflected due to the weight of the shutter, the shutter is contacted with the rotating disk, or a gap is formed between the case and the shutter due to the deflection of the disk holder at the time of preservation so that dust tends to be inserted into the cartridge from the window holes. Further, the reliability of the adhered portion of the disk holder to the case is deteriorated. Consequently, as described in the above embodiment, shutter opening and closing structures of the same structures are provided in both the upper and lower case sides and separately operated.

Figure 4A:
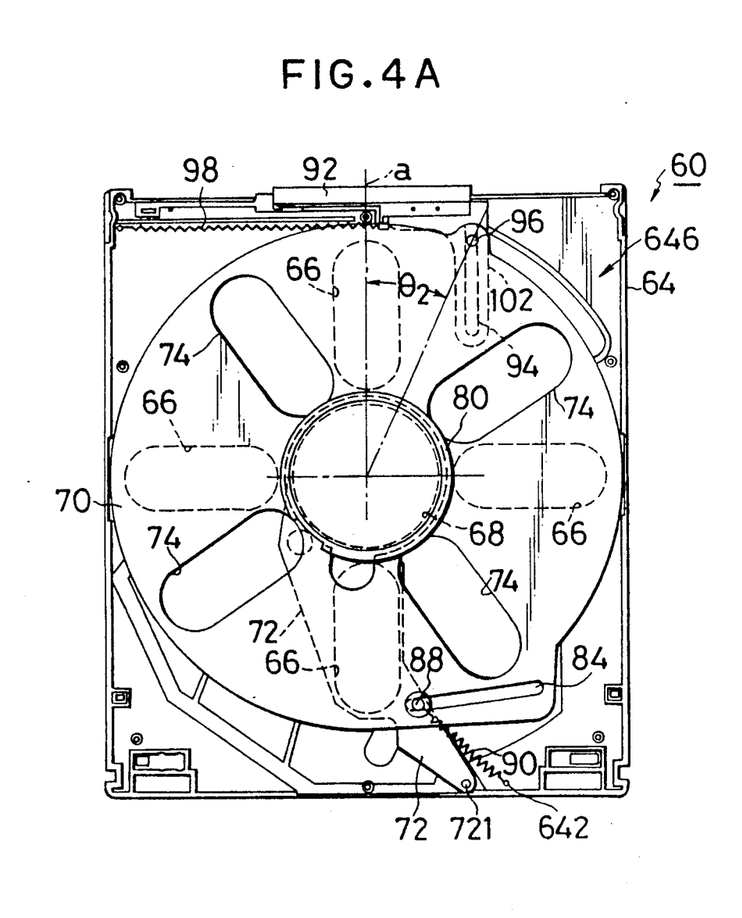
FIG. 4A is a plan view of a lower case showing an operating state of another embodiment of a disk cartridge in the case of closing a shutter according to the present invention.
Figure 4B:
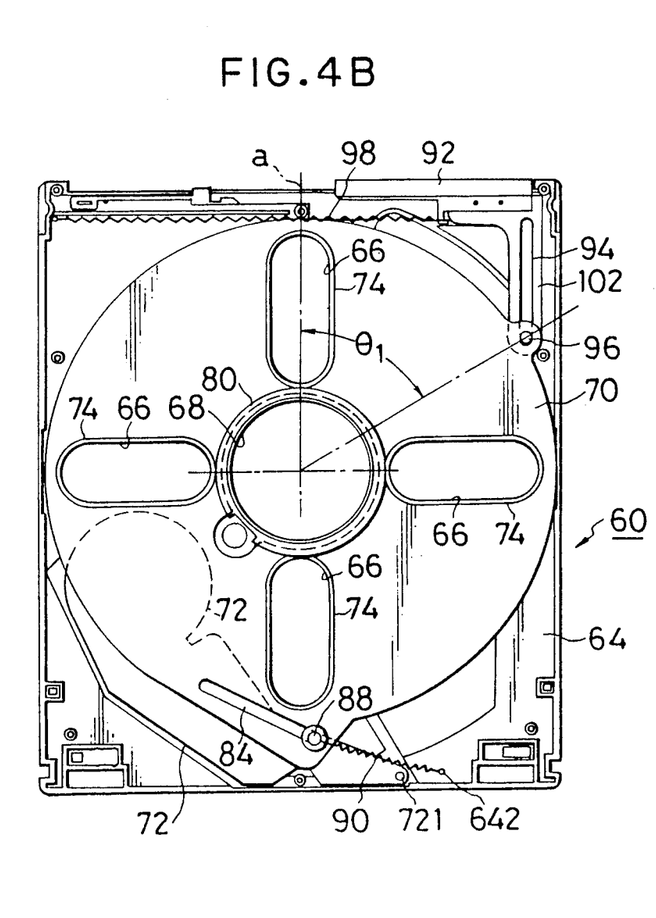
FIG. 4B is a plan view of a lower case showing another operating state of the same disk cartridge in the case of opening the shutter.
Figure 5:
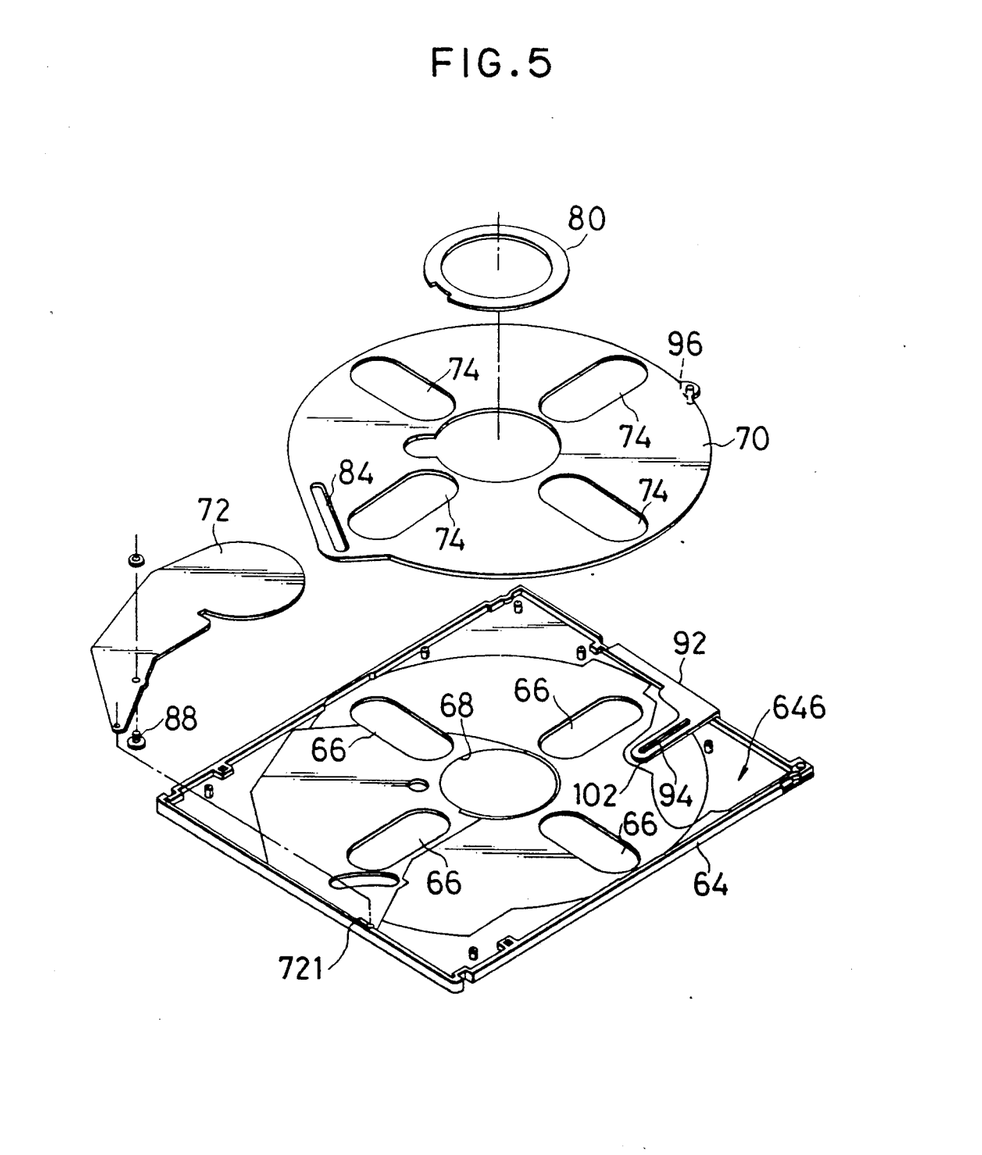
FIG. 5 is a perspective view of a disassembled lower case of the same disk cartridge.

Another embodiment of a disk cartridge of the present invention will be described with reference to FIGS. 4A to 5. A disk (not shown) is rotatably contained in a case 60 made of an upper case (not shown) and a lower case 64, and the case is provided with a plurality of pickup insertion holes 66 and a driving shaft insertion hole 68. A rotary shutter 70 formed with a plurality of window holes 74 at positions corresponding to the plurality of pickup insertion holes 66 is rotatably provided at a disk holder 80 provided at the driving shaft insertion hole 68 as a center. A turning shutter 72 for opening and closing the driving shaft insertion hole 18 is provided to be able to turn in the lower case 64 via a pivotal connector 721 having a center at a position separate from the center of the rotary shutter 70. The rotary shutter 70 is engaged with the turning shutter 72 in cooperation through the cam groove 84 and the engaging shaft 88. A spring 90 for energizing both the shutters 70 and 72 in a closing direction and for holding them at an opening position is extended at its one end to an engaging shaft 88 and at the other end to the inner wall 642 of the case near the pivotal connector 721 of the turning shutter 72. A slider 92 for opening and closing the rotary shutter 70 and the turning shutter 72 is slidably provided along the end of the case 64 at the opposite side to the pivotal connector 721 of the turning shutter 72. An actuating member 102 having a long hole 94 perpendicular to the sliding direction of the slider 92 is provided at the slider 92, and the long hole 94 is engaged with a pin 96 fixed to the vicinity of the outer periphery of the rotary shutter 70. A spring 98 is extended between the intermediate portion of the slider 92 and the corner of the case to energize the slider 92 toward the shutter closing direction. The operating range of the engaging portion of the long hole 94 with the pin 96 is disposed on the corner 646 of the case including a tangential line along the sliding direction of the slider 92 on the outer periphery of the rotary shutter 70. In this case, it is preferable to restrict the operating range of the engaging portion of the rotary shutter 70 with the slider 92, i.e., the engaging portion of the pin 96 with the long hole 94 to 55 degrees from a line a for connecting a contact point with a tangential line parallel to the sliding direction of the slider 92 on the periphery of the rotary shutter 70 to the rotating center of the rotary shutter 70 to one side or the other, and more preferably to an angular range from 55 degrees of the maximum angle $\theta_1$ to 20 degrees of the minimum angle $\theta_2$. The shutter opening or closing angle becomes very large or the shutter is deformed in the range except the above-described restricted range. Therefore, it would be avoided to operate it out of the restricted range.

When the disk cartridge of this embodiment is inserted and set in a recorder/reproducer, the slider 92 is moved together with the actuating member 102 against the spring 98, and the rotary shutter 70 is rotated at the disk holder 80 as a center by the pin 96 engaged with the long hole 94 formed at the actuating member 102 upon movement of the slider 92. Further, the turning shutter 72 is turned at the pivotal connector 721 as a center, the plurality of pickup insertion holes 66 and the driving shaft insertion hole 68 formed at the case 60 are opened together, and held in opening state as shown in FIG. 4B. On the other hand, when the disk cartridge is removed from the recorder/reproducer, the turning shutter 72 and the rotary shutter 70 are moved in closing direction by the springs 98 and 90 to close the insertion holes 66 and 68, and held in closing state as shown in FIG. 4A.

In the embodiment described above, the cam groove formed on the rotary shutter and the engaging shaft provided at the turning shutter are employed as a cam mechanism for cooperating the rotary shutter with the turning shutter. However, the present invention is not limited to the particular embodiment. For example, the cam groove and the engaging shaft may be provided at positions vice versa. Or, a recess and a projection are respectively formed at both the shutters or coupling members, and the projection may be engaged with the recess, or an interlocking mechanism may be constructed through another member between both the shutters.

According to the disk cartridge of the present invention, the rotary shutter and the turning shutter for opening and closing the pickup insertion holes and the driving shaft insertion hole are provided to be able to be cooperated. Therefore, the window holes can be easily completely shielded, and invasion of dust can be positively prevented. The turning shutter and the rotary shutter can be stably opened and closed, and are not rubbed with the disk in the case, or not damaged or cut in contact with the disk. Even if the disk cartridge in which a plurality of pickup insertion holes are provided is provided, the structure is simply and compactly formed.

This invention can be variously modified without departing from the spirit, scope and essential features thereof. Therefore, the above-described embodiments are mere illustration only at all respects, and not interpreted in a limited manner. The scope of the present invention is appended by the claims, but not limited by the text of the specification, and the modifications and alterations belonging to the equivalent scope of the claims should all included in the scope of the present invention.

What is claimed is:

1. A disk cartridge comprising:
a case rotatably containing a disk therein and formed with a driving shaft insertion hole and a plurality of pickup insertion holes,
a rotary shutter formed with a plurality of window holes at positions corresponding to said plurality of pickup insertion holes and rotatably provided around said driving shaft insertion hole as a first center, and
a turning shutter having a second center of rotation at a position separate from the first center of said rotary shutter for opening and closing said driving shaft insertion hole.

2. A disk cartridge according to claim 1, wherein said rotary shutter and said turning shutter are superposed to be provided on an inner surface of the case.

3. A disk cartridge according to claim 1, wherein said rotary shutter and said turning shutter are coupled cooperatively by a coupling member.

4. A disk cartridge according to claim 3, wherein said coupling member comprises a cam mechanism.

5. A disk cartridge according to claim 4, wherein said cam mechanism has a cam groove formed on said rotary shutter and an engaging shaft mounted to said turning shutter.

6. A disk cartridge according to claim 5, further comprising a slider sliding along an outer peripheral end portion of said case, and coupling means for coupling said slider to said rotary shutter.

7. A disk cartridge according to claim 5, further comprising a spring for biasing said rotary shutter and said turn shutter in a closing direction and for holding them in opening position, said spring being fixed at its one end to an engaging portion of said cam mechanism and at the other end to an inner wall portion of said case at a distance substantially equal both in opening position and closing position of said turning shutter.

8. A disk cartridge according to claim 7, wherein said spring is extended so that the direction of said cam groove becomes substantially the same as the biasing direction of said spring in opening position of said turning shutter.

9. A disk cartridge according to claim 6, wherein said slider is provided with an actuating member, said coupling means comprises a long hole perpendicular to the sliding direction of said slider formed at said actuating member and a pin mounted to said rotary shutter to be engaged with said long hole, and the operating range of the engaging portion of said pin with said long hole is provided in the vicinity of the corner of said case including a tangential line along the sliding direction of said slider on the periphery of said rotary shutter.

10. A disk cartridge according to claim 9, wherein the operating range of the engaging portion of said pin with said long hole is restricted within a rotating area of an angular range of 55 degrees or less from a line for connecting a crossing point with a tangential line along the sliding direction of said slider on the periphery of said rotary shutter to the rotating center of said rotary shutter.

11. A disk cartridge according to claim 6, wherein said coupling means comprises a cutout formed on the outer periphery of said rotary shutter and a pin mounted to said slider to be engaged with said cutout.

12. A disk cartridge according to claim 6, wherein said case is formed of an upper case and a lower case, each of said upper and lower cases is respectively formed with said driving shaft insertion hole and said plurality of pickup insertion holes, and provided with said rotary shutter, said turning shutter, and shutter opening and closing mechanism of the same structure but operating separately at the upper and lower case sides.

13. A disk cartridge according to claim 1, wherein each of the opening width of said window holes formed in said rotary shutter is formed s that the outer peripheral side thereof is larger than the inner peripheral side thereof.

14. A disk cartridge according to claim 1, wherein a surface of said rotary shutter opposed to said disk is formed of a metal material

15. A disk cartridge according to claim 14, wherein said rotary shutter is formed of a sheet of stainless steel.

16. A disk cartridge according to claim 14, wherein said rotary shutter is formed of a synthetic resin plate having a chromium-plated layer thereon.

17. A disk cartridge comprising:
- a half case formed with a driving shaft insertion hole and a plurality of pickup insertion holes,
- an annular disk holder mounted on an inner wall of said case of the periphery of said driving shaft insertion hole,
- a rotary shutter formed with a plurality of window holes at positions corresponding to said plurality of pickup insertion holes and rotatably supported by said disk holder about an axis,
- a turning shutter rotatably supported by a pivotal shaft provided in the case for opening and closing said driving shaft insertion hole the rotary shutter axis and said pivotal shaft being spaced apart,
- a coupling member for interlocking said rotary shutter to said turning shutter,
- a slider sliding along an outer peripheral end portion of said half case, and
- coupling means for coupling said slider to said rotary shutter to convert the sliding motion of said slider into the rotating motion of said rotary shutter,
- a pair of said half cases being joined together oppositely for rotatably containing a disk therein.

18. A disk cartridge according to claim 17, wherein said coupling member comprises a cam mechanism.

19. A disk cartridge according to claim 18, wherein said cam mechanism has a cam groove formed on said rotary shutter and an engaging shaft mounted to said turning shutter.

20. A disk cartridge according to claim 19, further comprising a spring for biasing said rotary shutter and said turning shutter in a closing direction and for holding them in opening position, said spring being fixed at its one end to an engaging portion of said cam mechanism and at the other end to an inner wall portion of said case at a distance substantially equal both in opening position and closing position of said turning shutter.

21. A disk cartridge according to claim 17, wherein said coupling means comprises a cutout formed on the outer periphery of said rotary shutter and a pin mounted to said slider to be engaged with said cutout.

22. A disk cartridge according to claim 21, wherein said slider is biased by a spring so as to close said shutters.

23. A disk cartridge according to claim 20, wherein said slider is provided with an actuating member, said coupling means comprises a long hole perpendicular to the sliding direction of said slider formed at said actuating member and a pin mounted to said rotary shutter to be engaged with said long hole, and the operating range of the engaging portion of said pin with said long hole is provided in the vicinity of the corner of said case including a tangential line along the sliding direction of said slider on the periphery of said rotary shutter.

24. A disk cartridge according to claim 17, wherein each of the opening width of said window holes formed in said rotary shutter is formed so that the outer peripheral side thereof is larger than the inner peripheral side thereof.

25. A disk cartridge according to claim 17, wherein a surface of said rotary shutter opposed to said disk is formed of a metal material.

26. A disk cartridge according to claim 20, wherein said coupling means comprises a cutout formed on the outer periphery of said rotary shutter and a pin mounted to said slider to be engaged with said cutout.

* * * * *